(12) United States Patent
Smith et al.

(10) Patent No.: US 10,433,478 B2
(45) Date of Patent: Oct. 8, 2019

(54) LAWN MOWER AND HAND PUSHED POWER TOOL

(71) Applicant: CHEVRON (HK) LIMITED, Wanchai (HK)

(72) Inventors: Derek Smith, Nanjing (CN); Toshinari Yamaoka, Nanjing (CN); Qian Liu, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 582 days.

(21) Appl. No.: 15/131,217

(22) Filed: Apr. 18, 2016

(65) Prior Publication Data

US 2016/0324065 A1 Nov. 10, 2016

(30) Foreign Application Priority Data

Feb. 5, 2015 (CN) .......................... 2015 1 0224942

(51) Int. Cl.
| | |
|---|---|
| *A01D 34/00* | (2006.01) |
| *A01D 34/68* | (2006.01) |
| *A01D 34/52* | (2006.01) |
| *A01D 101/00* | (2006.01) |

(52) U.S. Cl.
CPC .......... *A01D 34/001* (2013.01); *A01D 34/52* (2013.01); *A01D 34/68* (2013.01); *A01D 2034/6843* (2013.01); *A01D 2101/00* (2013.01)

(58) Field of Classification Search
CPC .......... A01D 2034/6843; A01D 34/001; A01D 34/52; A01D 34/68; A01D 34/10; A01D 2101/00; A01D 34/006; A01B 1/065; B62D 51/04

USPC .................................. 172/41; 180/19.3, 19.2
See application file for complete search history.

(56) References Cited

U.S. PATENT DOCUMENTS

| | | | | |
|---|---|---|---|---|
| 1,943,675 A | * | 1/1934 | Jacobsen ................ | A01D 34/62 56/11.8 |
| 2,166,450 A | * | 7/1939 | Smalley ............... | A01D 34/475 172/103 |
| 2,690,892 A | * | 10/1954 | La Bar ................... | A01D 34/58 191/12 R |
| 2,713,917 A | * | 7/1955 | Soenksen ........... | A01D 34/6806 180/19.1 |
| 2,997,890 A | * | 8/1961 | Burrows ............ | A01D 34/6806 474/117 |
| 3,443,657 A | * | 5/1969 | Sarlo ...................... | A01D 34/69 180/19.1 |

(Continued)

FOREIGN PATENT DOCUMENTS

| | | | | |
|---|---|---|---|---|
| EP | 0631714 A1 | * | 1/1995 | ......... A01D 34/6812 |
| EP | 2805597 A1 | * | 11/2014 | ............. A01D 34/68 |

*Primary Examiner* — Robert E Pezzuto
*Assistant Examiner* — Joan D Misa
(74) *Attorney, Agent, or Firm* — Greenberg Traurig, LLP (57) ABSTRACT

A lawn mower includes a cutting element for cutting grass, a motor for driving the cutting element to rotate, a housing for containing the motor and a handle device for a user to control the lawn mower. The handle device includes a handle including a gripping portion for the user to grip and a connection portion substantially extending along a direction of a first line, and a first operating element for the user to operate. The first operating element is capable of rotating about a first axis relative to the handle. The first axis is substantially parallel to the first line.

15 Claims, 5 Drawing Sheets

(56) References Cited

U.S. PATENT DOCUMENTS

| | | | | |
|---|---|---|---|---|
| 3,586,275 | A * | 6/1971 | Mittelstadt | A01D 34/822 248/52 |
| 3,603,065 | A * | 9/1971 | Weber | A01D 34/475 56/10.5 |
| 4,212,363 | A * | 7/1980 | Letner | B60K 26/00 16/437 |
| 4,362,228 | A * | 12/1982 | Plamper | A01D 34/6812 477/170 |
| 4,466,233 | A * | 8/1984 | Thesman | A01D 34/6812 192/14 |
| 4,493,180 | A * | 1/1985 | Wick | A01D 34/6806 56/10.5 |
| 4,538,401 | A * | 9/1985 | Takamizawa | A01D 34/6806 180/19.3 |
| 4,573,307 | A * | 3/1986 | Wick | A01D 34/6806 56/10.8 |
| 4,747,256 | A * | 5/1988 | Sadakane | A01D 34/6806 56/10.8 |
| 4,835,952 | A * | 6/1989 | McLane | A01D 34/74 280/43.13 |
| 4,856,264 | A * | 8/1989 | Nishimura | A01D 34/6806 56/10.9 |
| 4,878,339 | A * | 11/1989 | Marier | A01D 34/64 56/14.7 |
| 4,932,192 | A * | 6/1990 | Ishimaru | A01D 34/6806 56/10.8 |
| 5,203,147 | A * | 4/1993 | Long | A01D 34/6818 56/10.1 |
| 5,442,901 | A * | 8/1995 | Niemela | A01D 34/6806 180/65.6 |
| 5,488,818 | A * | 2/1996 | Powers | A01D 34/6806 180/6.48 |
| 5,511,367 | A * | 4/1996 | Powers | A01D 34/6806 180/19.3 |
| 6,557,331 | B2 * | 5/2003 | Busboom | A01D 34/6806 56/10.8 |
| 6,668,529 | B2 * | 12/2003 | Busboom | A01D 34/6806 56/10.8 |
| 6,904,740 | B2 * | 6/2005 | Derby, V | A01D 34/6806 56/10.5 |
| 7,111,443 | B2 * | 9/2006 | Anderson | A01D 34/47 56/10.8 |
| 7,237,620 | B2 * | 7/2007 | Abenroth | A01B 33/028 172/15 |
| 7,275,615 | B2 * | 10/2007 | Derby, V | A01D 34/824 180/19.3 |
| 7,364,169 | B2 * | 4/2008 | Velke | A01D 34/82 280/32.7 |
| 7,478,689 | B1 * | 1/2009 | Sugden | A01D 34/67 180/19.3 |
| 7,523,600 | B2 * | 4/2009 | Sasaoka | A01D 34/824 180/19.3 |
| 7,740,091 | B2 * | 6/2010 | Bartel | A01D 34/68 180/19.1 |
| 9,038,356 | B2 * | 5/2015 | Shao | B25G 3/38 16/437 |
| 9,060,463 | B2 * | 6/2015 | Yamaoka | A01D 34/828 |
| 9,163,707 | B2 * | 10/2015 | Helin | A01D 34/6806 |
| 9,185,843 | B2 * | 11/2015 | Kaskawitz | A01D 34/6806 |
| 9,403,435 | B2 * | 8/2016 | Bejcek | B60K 26/02 |
| D776,721 | S * | 1/2017 | Martin | D15/11 |
| 9,717,177 | B2 * | 8/2017 | Bian | A01D 34/824 |
| 9,888,627 | B2 * | 2/2018 | Yamaoka | A01D 34/824 |
| 9,968,031 | B2 * | 5/2018 | Bejcek | A01D 34/006 |
| 2011/0108335 | A1 * | 5/2011 | Levander | A01D 34/824 180/19.3 |
| 2014/0345416 | A1 * | 11/2014 | Kaskawitz | A01D 34/68 74/523 |
| 2018/0146617 | A1 * | 5/2018 | Oota | A01D 34/824 |
| 2018/0146619 | A1 * | 5/2018 | Oota | A01D 34/69 |

* cited by examiner

LAWN MOWER AND HAND PUSHED POWER TOOL

RELATED APPLICATION INFORMATION

This application claims the benefit under 35 U.S.C. § 119(a) of Chinese Patent Application No. CN 201510224942.2, filed on May 5, 2015, the disclosure of which is incorporated herein by reference in its entirety.

FIELD OF THE DISCLOSURE

The present disclosure relates generally to hand pushed power tools and, more particularly, to a lawn mower.

BACKGROUND OF THE DISCLOSURE

With the increasing use of gardening tools, lawn mowers are more and more popular. A lawn mower is a mechanical tool for trimming the lawn and the vegetation. The lawn mower includes a cutting blade, a main body and a handle device. According to the working manner, lawn mowers include an intelligent semiautomatic type, a walk behind type, a ride-on type, and a tractor type.

A self-propelled lawn mower includes an operating element for controlling a self-propelled movement of the lawn mower. However, for the currently known, self-propelled lawn mower, the operating element is disposed at an unreasonable position, so while a user grips a handle, the operating element may not be operated conveniently.

The statements in this section merely provide background information related to the present disclosure and may not constitute prior art.

SUMMARY

In one aspect of the disclosure, a lawn mower includes a cutting element for cutting grass, a motor for driving the cutting element to rotate, a housing for containing the motor and a handle device for a user to control the lawn mower. The handle device includes a handle including a gripping portion for the user to grip and a connection portion substantially extending along a direction of a first line, and a first operating element for the user to operate. The first operating element is capable of rotating about a first axis relative to the handle. The first axis is substantially parallel to the first line.

In another aspect of the disclosure, a hand pushed power tool includes a functional element for realizing a tool function, a motor for driving the functional element, a housing for containing the motor, and a handle device for a user to control the hand pushed power tool. The handle device includes a handle including a gripping portion for the user to grip and a connection portion substantially extending along a direction of a first line, and a first operating element for the user to operate. The first operating element is capable of rotating about a first axis relative to the handle. The first axis is substantially parallel to the first line.

Further areas of applicability will become apparent from the description provided herein. It should be understood that the description and specific examples are intended for purposes of illustration only and are not intended to limit the scope of the present disclosure.

The drawings described herein are for illustrative purposes only of selected embodiments and not all possible implementations, and are not intended to limit the scope of the claims hereinafter presented. Corresponding reference numerals indicate corresponding portions throughout the several views of the drawings.

DETAILED DESCRIPTION

The following description of the preferred embodiments is merely exemplary in nature and is in no way intended to limit the scope of the claimed invention, its application, or uses.

Figure 1:
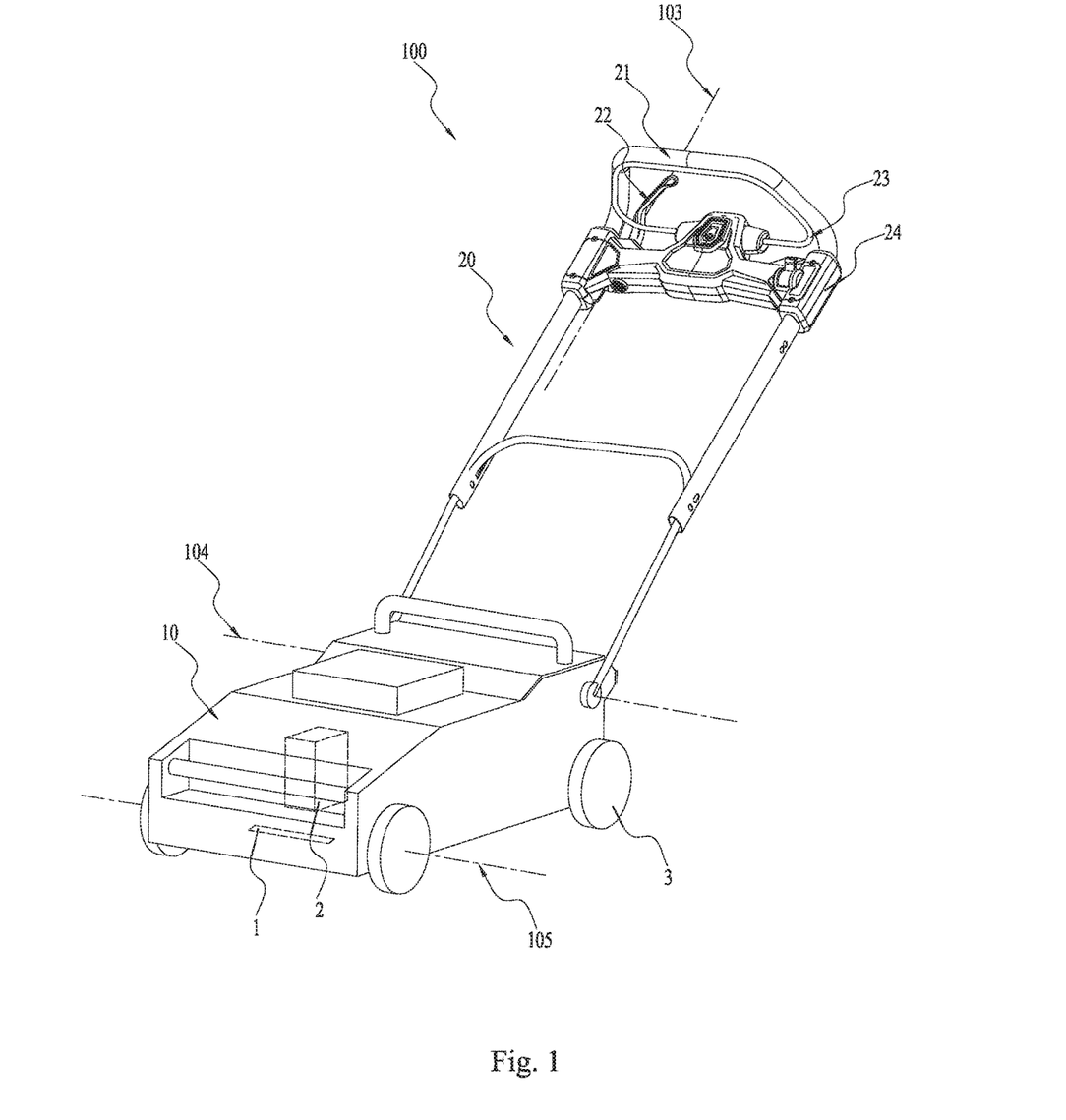
FIG. 1 is a schematic view of an exemplary lawn mower.

As shown in FIG. 1, a hand pushed power tool can be pushed by a user to move over the ground. For example, the hand pushed power tool can be a lawn mower 100. The lawn mower 100 includes a cutting element 1, a motor 2, a housing 10 and a handle device 20. The cutting element 1 can be a cutting blade for cutting the grass. The motor 2 is used to drive the cutting element 1 to rotate so as to realize the cutting function. The housing 10 is used to contain the motor 2. The cutting element 1, the motor 2 and the housing 10 cooperate together as a main body of the lawn mower 100.

Figure 2A:
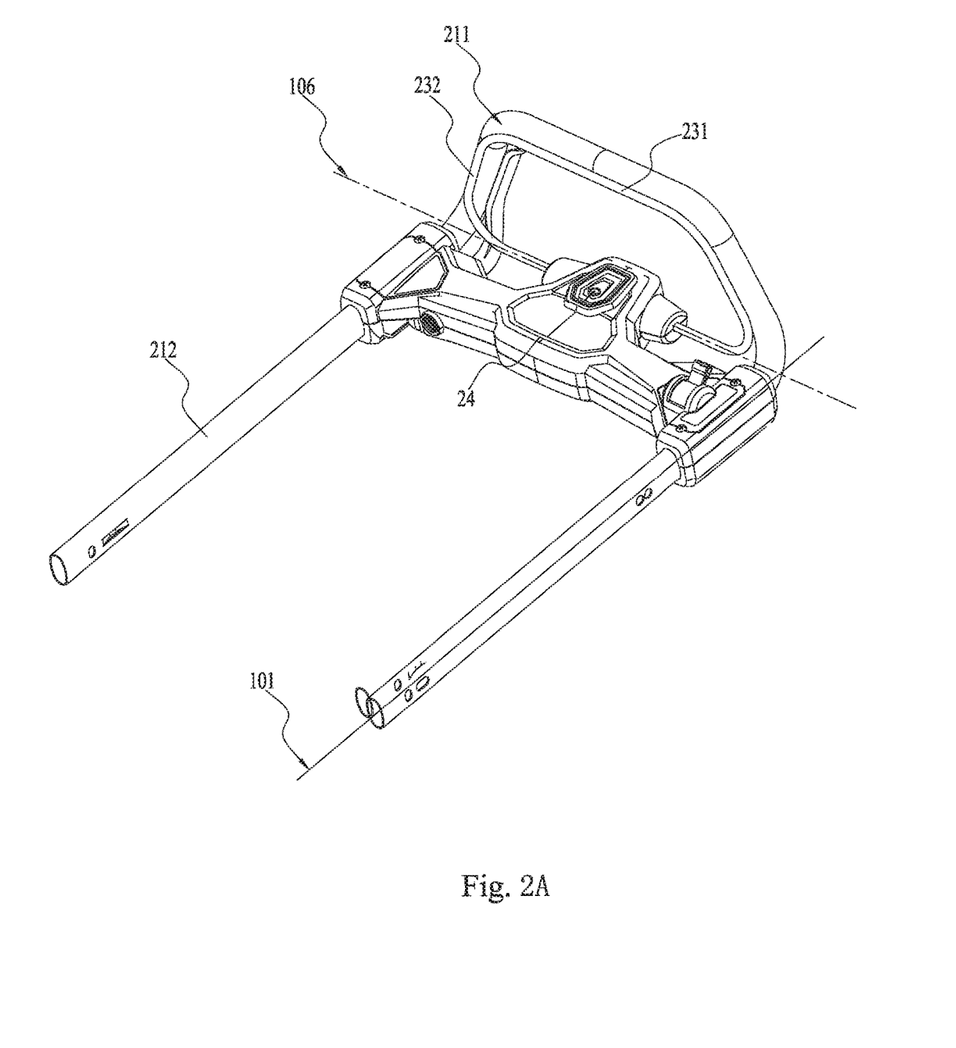
FIG. 2A is a schematic view of a handle device of the lawn mower in FIG. 1, wherein a first operating element is located at a preset position.
Figure 2B:
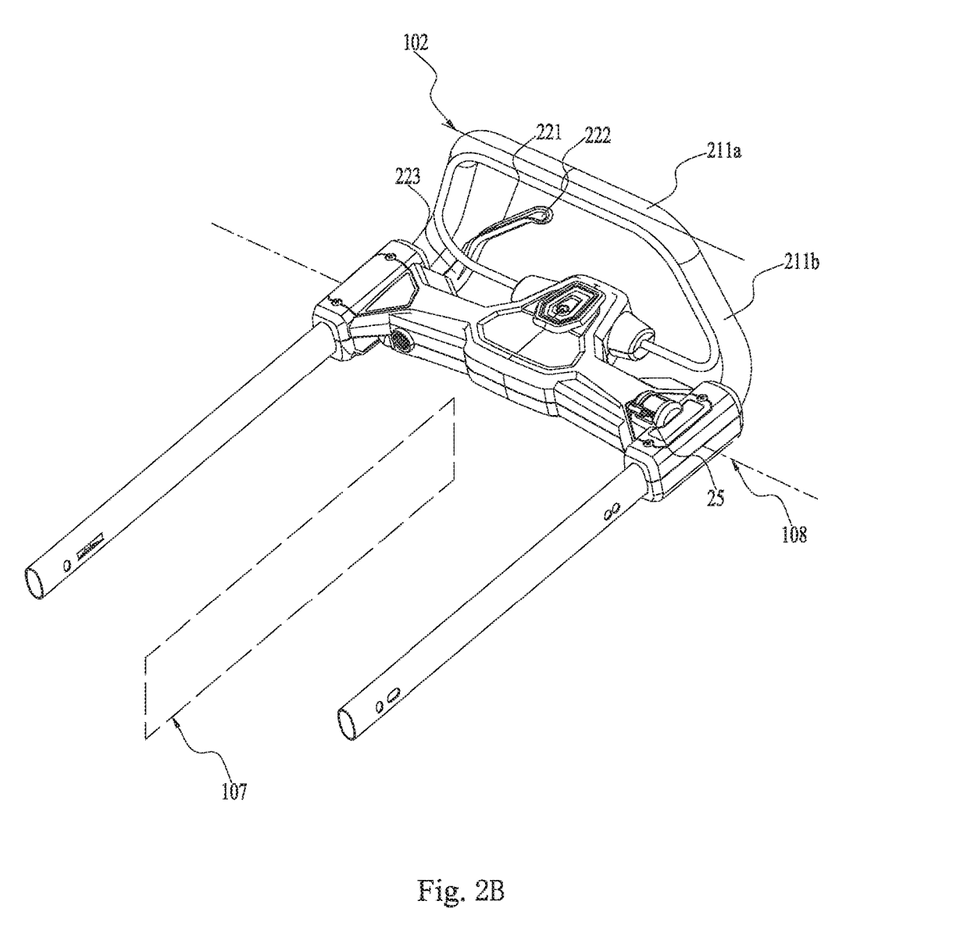
FIG. 2B is a schematic view of the handle device of the lawn mower in FIG. 1, wherein the first operating element is located at another position.

Referring to FIGS. 1 and 2A-2B, the handle device 20 is for a user to control the lawn mower 100. The handle device 20 includes a handle 21 and a first operating element 22. The lawn mower 100 further includes wheels 3, so that the lawn mower 100 can move over the grass. The handle 21 includes a gripping portion 211 for the user to grip and a connection portion 212 extending along a direction of a first line 101. The gripping portion 211 and the connection portion 212 are integrally formed.

The gripping portion 211 includes a first gripping section 211a and a second gripping section 211b. The user can grip the first gripping section 211a or the second gripping section 211b to push the lawn mower 100 over the grass according to his operating habits. The first gripping section 211a is extended along a direction of a second line 102. The second line 102 is parallel to a line that is substantially perpendicular to the first line 101. The gripping portion 211 includes two second gripping sections 211b which are respectively connected with the two ends of the first gripping section 211a, so that the gripping portion 211 generally has a U shape. An angle between each second gripping section 211b and the first gripping section 211a is greater than or equal to 90 degrees and less than 180 degrees, so that the gripping portion 211 provides a comfortable and convenient gripping feeling. Further, the angle is greater than or equal to 100 degrees and less than 160 degrees.

The handle 21 includes two connection portions 212 which are respectively disposed on the two ends of the gripping portion 211. Each connection portion 212 has a first end and a second end. The first end is connected with the gripping portion 211 and the second end is connected with the housing 10, so that the handle device 20 and the housing 10 are connected as a whole. The two connection portions 212 are respectively connected with the two second gripping sections 211b on their two ends that depart from the first gripping section 211a. Each second gripping section 211b is extended along a direction which is substantially perpendicular to the first line 101. The second gripping sections 211b are located on a side of the connection portions 212, so it is convenient for the user to grip the second gripping sections 211b.

The first operating element 22 is used to control a first function of the lawn mower 100. For example, the first function may be turning on/off the motor 2, adjusting the speed of the motor 2, activating the wheels 3 to move the device or adjusting the walking speed of the wheels 3. In the present embodiment, preferably, the first function is activating the wheels 3 to move so as to realize a self-propelled movement of the lawn mower 100. The first operating element 22 is capable of rotating about a first axis 103 relative to the gripping portion 211. The first axis 103 is substantially parallel to the first line 101. The handle device 20 in the invention hereinafter claimed has a reasonable structure. During operating the lawn mower 100, the user can operate the first operating element 22 while gripping the gripping portion 211.

As shown in FIG. 1, the handle device 20 is capable of rotating about a second axis 104 relative to the housing 10. The second axis 104 is substantially perpendicular to the first axis 103. The user can adjust the handle device 20 to a comfort angle relative to the housing according to his height and operating habits. Further, the handle device 20 can be folded relative to the housing 10 so that the lawn mower 100 can be transported and stored conveniently. Specifically, the ends of the connection portions 212 are respectively connected rotatably with the housing 10 about the second axis 104. The second axis 104 is located at a connection position of the connection portions 212 and the housing 10. The wheels 3 are capable of rotating about a third axis 105 relative to the housing 10. The third axis 105 is substantially parallel to a line, such as the line defined by the second axis 104, that is perpendicular to the first axis 103. Thus, it is convenient to adjust the angle of the handle device 20 relative to the housing while the lawn mower 100 is being moved. The lawn mower 100 includes at least two pairs of wheels 3. Each pair of wheels 3 is respectively located on two sides of the housing 10 so as to support the housing 10. The wheels 3 have a central axis which is substantially parallel to the second axis 104. The central axis is the third axis 105 about which the wheels 3 rotate.

The handle device 20 includes a second operating element 23 for controlling a second function of the lawn mower 100. The second function is different from the first function. For example, the second operating element 23 can be a trigger for activating the motor 2. With reference to FIGS. 1 and 2A, the second operating element 23 is capable of rotating about a fourth axis 106 relative to the gripping portion 211. The fourth axis 106 is substantially perpendicular to the first line 101. Thus, the user can operate the first and second operating elements 22, 23 while gripping the gripping portion 211. It is to be understood that when the first line 101 is intersected obliquely with the second line 102, an angle between the first axis 103 and the fourth axis 106 is greater than 0 degree and less than or equal to 90 degrees. The first axis 103 is intersected obliquely with the fourth axis 106. So the user can operate the first and second operating elements 22, 23 while gripping the gripping portion 211.

Figure 3A:
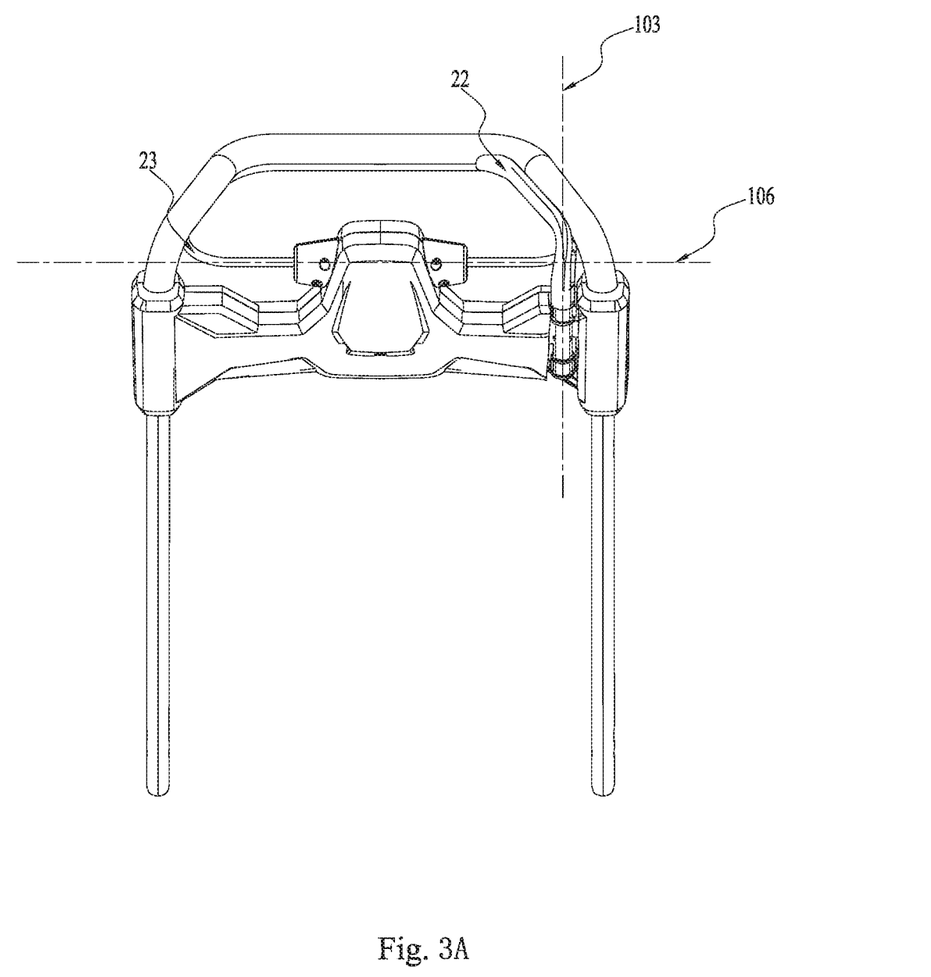
FIG. 3A is a rear view of the handle device of the lawn mower in FIG. 1, wherein the first operating element is located at the preset position.
Figure 3B:
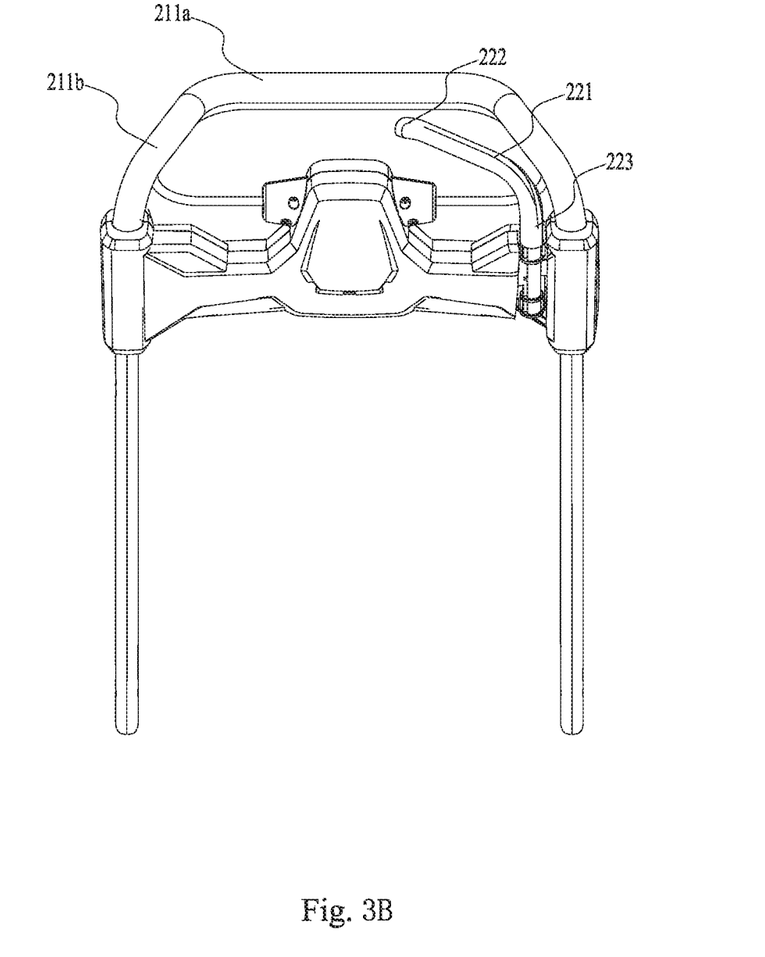
FIG. 3B is a rear view of the handle device of the lawn mower in FIG. 1, wherein the first operating element is located at another position.

Referring to FIGS. 2A-2B and 3A-3B, the first operating element 22 includes a first operating portion 221, a second operating portion 222 and a rotation portion 223. The first and second operating portions 221, 222 can be operated by the user. The rotation portion 223 is used to connect the first operating element 22 with the handle device 20. The first operating portion 221 is extended along a first direction, and the second operating portion 222 is extended along a second direction. The first direction is intersected obliquely with the second direction. The rotation portion 223 is extended along the first axis 103. When the user operates the first or second operating portion 221, 222, the rotation portion 223 can rotate about the first axis 103 and drive the first operating element 22 to move from a position in FIGS. 2B and 3B to a preset position in FIGS. 2A and 3A. Referring to FIGS. 2B and 3B, the first operating portion 221 is connected with the rotation portion 223 and, the second operating portion 222 is extended obliquely from the first operating portion 221. When the first operating element 22 is rotated to the preset position, the first operating portion 221 is fitted to the second gripping section 211b. The second operating portion 222 is so arranged to extend in a direction that the first operating portion 221 is fitted to the first and second gripping portions 211a, 211b at the same time. Thus, the user can operate the first operating portion 221 to rotate the first operating element 22 to the preset position while gripping the second gripping section 211b, and operate the second operating portion 222 to rotate the first operating element 22 to the preset position while gripping the first gripping section 211a. That is to say, however the user grips the gripping portion 211, he can operate the first operating element 22 at the same time. So the operating convenience is improved greatly. It is noted that, the drawings only show a part of the length of the second operating element 222. For operating conveniently, the length of the second operating element 222 may be at least a quarter of the length of the first gripping section 211a. When the first operating element 22 is operated to the preset position, the first operating portion 211 is stopped by the second gripping section 211b and abuts on the second gripping section 211b. Thus, the first operating element 22 is avoided to be controlled unstably by the user so that the first operating element 22 cannot be located at the preset position stably.

The second operating element 23 includes a pull rod 231 and a side rod 232. The pull rod 231 can be operated by the user, and the side rod 232 is used to connect rotatably the second operating element 23 with the handle device 20. The pull rod 231 is substantially extended along a direction parallel to the second line 102. The side rod 232 is connected with an end of the pull rod 231. When the pull rod 231 is operated by the user, the side rod 232 is capable of rotating about the fourth axis 106 and driving the second operating element 23 rotate from an inactivating position of the motor 2 to an activating position of the motor 2. When the second operating element 23 is located at the activating position of the motor 2, the pull rod 231 is fitted to the first gripping section 211a, the side rod 232 is fitted to the second gripping section 211b, and the motor 2 can be activated. When the second operating element 23 is located at the activating position of the motor 2, the pull rod 231 and the side rod 232 are stopped by the gripping portion 211 and abut on the gripping portion 211. Thus, the first operating element 22 is avoided to be controlled unstably by the user so that the activating status of the motor 2 is unstable.

The two connection portions 212 of the handle device 20 are substantially parallel to each other. The first operating element 22 is disposed on a side of a symmetry plane 107 of the two connection portions 212 as shown in FIG. 2B. The second operating element 23 is symmetrical relative to the symmetry plane 107. The first operating element 22 is close to one of the two connection portions 212, and the second operating element 23 is located in the middle of the two connection portions 212. In the present embodiment, the handle device 20 only includes the first operating element 22 which is disposed on a side of the symmetry plane 107. However, in order to suit different users with different operating habits, for example the left-handers, the handle device 20 may include two first operating elements 22 which are respectively disposed on the two sides of the symmetry plane 107. The user can control one or two first operating elements 22 to realize the first function.

As shown in FIG. 1, the handle device 20 includes a holding element 24 for mounting the first and second operating elements 22, 23. Referring to FIGS. 2A-2B, the holding element 24 is approximately extended in a direction that is substantially perpendicular to the first line 101. The two ends of the holding element 24 are respectively fixed to the two connection portions 212. The first operating element 22 is connected rotatably with a connection of the holding element 24 and one of the two connection portions 212. The second operating element 23 is connected rotatably with a middle portion of the holding element 24 along a direction that is substantially perpendicular to the first line 101, and located on a side of the holding element 24 that is close to the gripping portion 211.

A third operating element 25 is arranged at the holding element 24, which is used to control a third function of the lawn mower 100. For example, the third function may be adjusting the walking speed of the wheels 3. The third operating element 25 is connected rotatably with the holding element 24 about a fifth axis 108. The fifth axis 108 is substantially perpendicular to the first axis 103. Preferably, the third operating element 25 is disposed on an end of the holding element 24 which departs from the first operating element 22, so that it is convenient for the user to operate the first and third operating elements 22, 25 with his two hands. The third operating element 25 can be rotated from a first position in FIG. 2A to a second position in FIG. 2B so as to realize a two-step speed adjustment. It is to be understood that the third operating element 25 can be rotated to any position between the first and second positions so as to realize a stepless speed adjustment.

The hand pushed power tool in the invention hereinafter claimed may be a snow sweeper. The snow sweeper includes a functional element which is a scraper. For the snow sweeper, the first operating element may be used to start the snow sweeper, control the self-propelled movement or adjust a snow throwing angle.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:
1. A lawn mower, comprising:
a cutting element for cutting grass;
a motor for driving the cutting element to rotate;
a housing for containing the motor; and
a handle device;

wherein the handle device comprises:
a handle comprising a gripping portion for a user to grip and a connection portion substantially extending along a direction of a first line; and
a first operating element for being operated by the user to control a function of the lawn mower, the first operating element being capable of rotating about a first axis relative to the handle, the first axis being substantially parallel to the first line,
wherein the first operating element comprises a first operating portion extending along a first direction and a second operating portion extending along a second direction wherein the first direction is intersected obliquely with the second direction,
wherein the gripping portion comprises a first gripping section substantially extending along a direction of a second line, wherein the second line is substantially parallel to a line that is perpendicular to the first line, and a second gripping section for connecting the first gripping section with the connection portion such that, when the first operating element is rotated to a preset position, the first operating portion is fitted to the second gripping section and, the second operating portion is fitted to the first gripping section, and
wherein the handle device comprises a second operating element being capable of rotating about a fourth axis relative to the handle, the second operating element comprises a pull rod extending along a direction substantially parallel to the second line and a side rod connected with an end of the pull rod, wherein the second operating element is used to activate the motor and wherein, when the second operating element is rotated to an activating position, the pull rod is fitted to the first gripping section and the side rod is fitted to the second gripping section.

2. The lawn mower of claim 1, wherein the handle device is capable of rotating about a second axis relative to the housing, the second axis is substantially perpendicular to the first axis.

3. The lawn mower of claim 1, further comprises wheels which are capable of rotating about a third axis relative to the housing, the third axis is substantially parallel to a line that is perpendicular to the first axis.

4. The lawn mower of claim 1, further comprises wheels for supporting the housing, the wheels comprise a central axis which is substantially parallel to a line that is perpendicular to the first axis.

5. The lawn mower of claim 4, wherein the handle device comprises a second operating element being capable of rotating about a fourth axis relative to the handle, the fourth axis is substantially perpendicular to the first line.

6. The lawn mower of claim 1, wherein the handle device comprises a second operating element being capable of rotating about a fourth axis relative to the handle, an angle between the first axis and the fourth axis is greater than zero degrees (0°) and less than or equal to ninety degrees (90°).

7. The lawn mower of claim 6, wherein the handle comprises two connection portions which are substantially parallel to each other, the first operating element is disposed on a side of a symmetry plane of the two connection portions and the second operating element is symmetrical relative to the symmetry plane.

8. The lawn mower of claim 7, further comprising wheels for supporting the housing, and wherein the first operating element is used to control a self-propelled movement function of the wheels.

9. A hand pushed power tool, comprising:
a functional element for realizing a tool function;
a motor for driving the functional element;
a housing for containing the motor; and
a handle device;
wherein the handle device comprises:
a handle comprising a gripping portion for the user to grip and a connection portion substantially extending along a direction of a first line; and
a first operating element for the user to operate to control a functional operation of the tool, the first operating element being capable of rotating about a first axis relative to the handle, the first axis being substantially parallel to the first line,
wherein the first operating element comprises a first operating portion extending along a first direction and a second operating portion extending along a second direction wherein the first direction is intersected obliquely with the second direction, and wherein the gripping portion comprises a first gripping section substantially extending along a direction of a second line,
wherein the second line is substantially parallel to a line that is perpendicular to the first line, and a second gripping section for connecting the first gripping section with the connection portion, such that, when the first operating element is rotated to a preset position, the first operating portion is fitted to the second gripping section and the second operating portion is fitted to the first gripping section, and
wherein the handle device comprises a second operating element being capable of rotating about a fourth axis relative to the handle, the second operating element comprises a pull rod extending along a direction substantially parallel to the second line and a side rod connected to an end of the pull rod, wherein the second operating element is used to activate the motor, and, when the second operating element is rotated to an activating position, the pull rod is fitted to the first gripping section and the side rod is fitted to the second gripping section.

10. The hand pushed power tool of claim 9, wherein the handle device is capable of rotating about a second axis relative to the housing, the second axis is substantially perpendicular to the first axis.

11. The hand pushed power tool of claim 9, further comprises wheels which are capable of rotating about a third axis relative to the housing, the third axis is substantially parallel to a line that is perpendicular to the first axis.

12. The hand pushed power tool of claim 9, further comprises wheels for supporting the housing, the wheels comprise a central axis which is substantially parallel to a line that is perpendicular to the first axis.

13. The hand pushed power tool of claim 12, wherein the handle device comprises a second operating element being capable of rotating about a fourth axis relative to the handle, the fourth axis is substantially perpendicular to the first line.

14. The hand pushed power tool of claim 9, wherein the handle device comprises a second operating element being capable of rotating about a fourth axis relative to the handle, an angle between the first axis and the fourth axis is greater than zero degrees (0°) and less than or equal to ninety degrees (90°).

15. The hand pushed power tool of claim 9, further comprising wheels for supporting the housing, and wherein the first operating element is used to control a self-propelled movement of the wheels.

* * * * *

UNITED STATES PATENT AND TRADEMARK OFFICE
CERTIFICATE OF CORRECTION

PATENT NO. : 10,433,478 B2
APPLICATION NO. : 15/131217
DATED : October 8, 2019
INVENTOR(S) : Derek Smith et al.

It is certified that error appears in the above-identified patent and that said Letters Patent is hereby corrected as shown below:

On the Title Page

Item (71), Applicant: [Chevron] should be "Chervon"

Signed and Sealed this
Eleventh Day of June, 2024

Katherine Kelly Vidal
*Director of the United States Patent and Trademark Office*